(12) United States Patent
Komatsu

(10) Patent No.: US 8,307,306 B2
(45) Date of Patent: Nov. 6, 2012

(54) SELECTION CANDIDATE DISPLAY METHOD, SELECTION CANDIDATE DISPLAY DEVICE, AND INPUT/OUTPUT DEVICE

(75) Inventor: Yoshie Komatsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 425 days.

(21) Appl. No.: 12/680,468

(22) PCT Filed: Oct. 15, 2008

(86) PCT No.: PCT/JP2008/068683
§ 371 (c)(1),
(2), (4) Date: Mar. 26, 2010

(87) PCT Pub. No.: WO2009/051145
PCT Pub. Date: Apr. 23, 2009

(65) Prior Publication Data
US 2010/0251182 A1    Sep. 30, 2010

(30) Foreign Application Priority Data

Oct. 18, 2007    (JP) .................................. P2007-271840

(51) Int. Cl.
*G06F 3/048* (2006.01)
(52) U.S. Cl. ........................................................ 715/834
(58) Field of Classification Search .................... 715/834
See application file for complete search history.

(56) References Cited

U.S. PATENT DOCUMENTS

| | | | |
|---|---|---|---|
| 6,239,803 B1 * | 5/2001 | Driskell ......................... | 715/810 |
| 6,411,337 B2 * | 6/2002 | Cove et al. ..................... | 348/563 |
| 7,350,158 B2 * | 3/2008 | Yamaguchi et al. .......... | 715/834 |
| 7,503,014 B2 * | 3/2009 | Tojo et al. ..................... | 715/810 |
| 7,509,348 B2 * | 3/2009 | Burtner et al. ................ | 1/1 |
| 7,536,653 B2 * | 5/2009 | Badovinac et al. ............ | 715/810 |
| 7,930,650 B2 * | 4/2011 | Brodersen et al. ............ | 715/838 |
| 8,028,250 B2 * | 9/2011 | Vronay et al. ................. | 715/853 |
| 8,046,714 B2 * | 10/2011 | Yahiro et al. .................. | 715/810 |
| 8,127,229 B2 * | 2/2012 | Inoguchi et al. .............. | 715/273 |
| 8,140,996 B2 * | 3/2012 | Tomkins ........................ | 715/785 |
| 2004/0076444 A1 * | 4/2004 | Badovinac et al. ............ | 399/81 |
| 2004/0155907 A1 * | 8/2004 | Yamaguchi et al. .......... | 345/810 |
| 2004/0221243 A1 * | 11/2004 | Twerdahl et al. ............. | 715/834 |

(Continued)

FOREIGN PATENT DOCUMENTS

JP          6-149518 A          5/1994

(Continued)

*Primary Examiner* — Tuyetlien Tran
*Assistant Examiner* — Jessica Chuang
(74) *Attorney, Agent, or Firm* — Birch, Stewart, Kolasch & Birch, LLP

(57) ABSTRACT

A selection candidate display method, a selection candidate display device, and an input/output device are provided. When a number of receivable broadcasting stations is not "4" or less, a controller allocates the receivable broadcasting stations to three segmented logical areas among four segmented logical areas, allocates a scroll area to the remaining one logical area, and displays the channel numbers of the allocated receivable broadcasting stations and information indicating the scroll area, for example, "S" in the respective logical areas of a circle pad. When the logical area to which the scroll area is allocated is operated, the controller moves the scroll area to the adjacent logical area and allocates the next receivable broadcasting station after the broadcasting station allocated to the remaining logical area among the logical areas adjacent to the scroll area, to the logical area which was the scroll area.

5 Claims, 14 Drawing Sheets

U.S. PATENT DOCUMENTS

| | | | |
|---|---|---|---|
| 2004/0250217 A1* | 12/2004 | Tojo et al. | 715/810 |
| 2005/0044509 A1* | 2/2005 | Hunleth et al. | 715/834 |
| 2006/0192753 A1* | 8/2006 | Fukuhara | 345/156 |
| 2008/0046888 A1* | 2/2008 | Appaji | 718/102 |
| 2009/0327964 A1* | 12/2009 | Mouilleseaux et al. | 715/834 |

FOREIGN PATENT DOCUMENTS

| | | |
|---|---|---|
| JP | 2003-256101 A | 9/2003 |
| JP | 2003-274310 A | 9/2003 |
| JP | 2006-229621 A | 8/2006 |
| WO | WO-03/062976 A1 | 7/2003 |

* cited by examiner

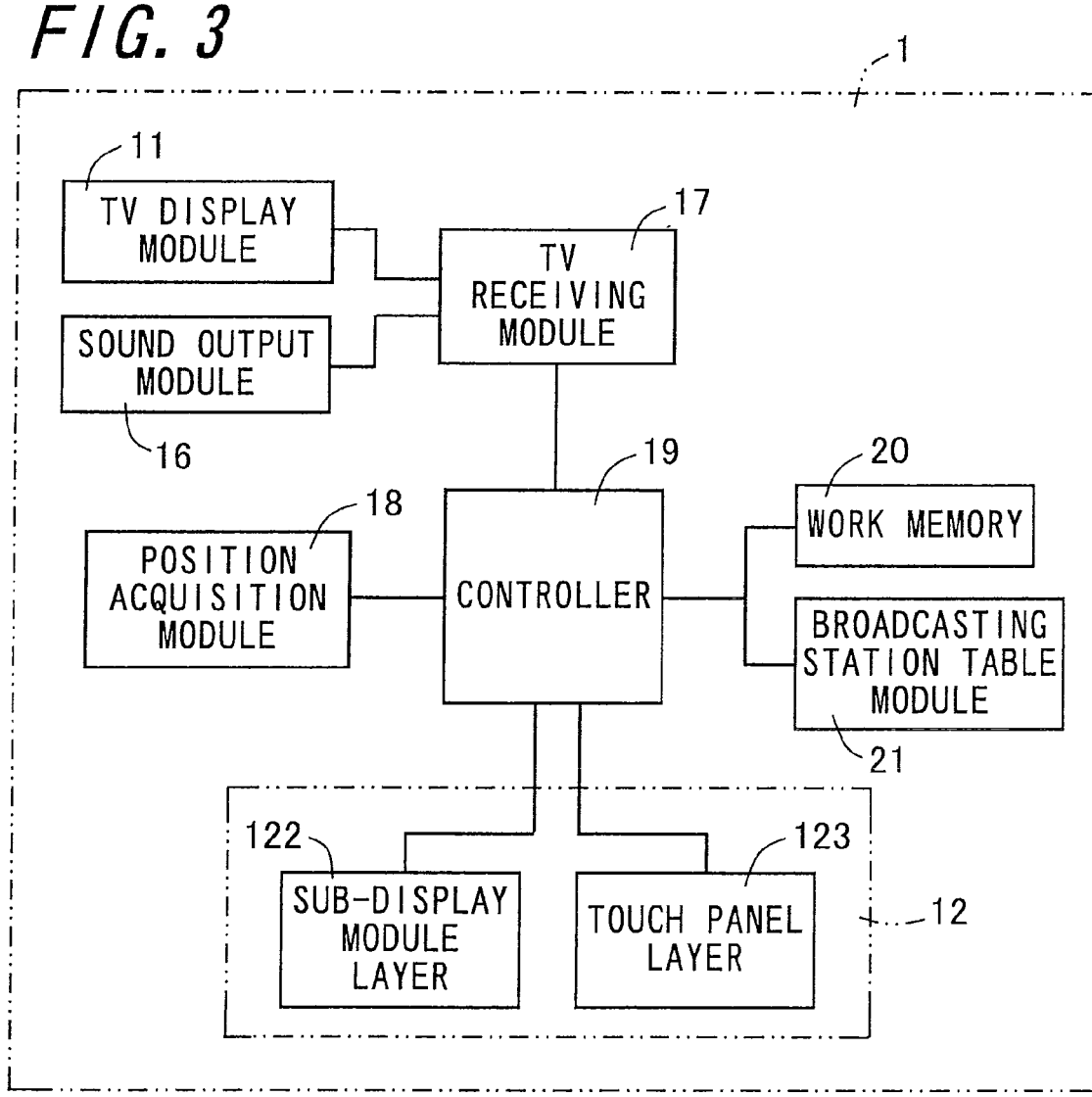

FIG. 4

| No. | AREA NAME | STARTING POSITION | FINISHING POSITION | RECEIVABLE BROADCASTING STATION QUANTITY | RECEIVABLE BROADCASTING STATIONS | | | | | |
|---|---|---|---|---|---|---|---|---|---|---|
| | | | | | BROAD-CASTING STATION 1 | BROAD-CASTING STATION 2 | BROAD-CASTING STATION 3 | BROAD-CASTING STATION 4 | ... | BROAD-CASTING STATION n |
| 1 | AREA A | (Xas, Yas) | (Xae, Yae) | 10 | 1 | 1 | 1 | 1 | ... | 1 |
| 2 | AREA B | (Xbs, Ybs) | (Xbe, Ybe) | 11 | 1 | 1 | 1 | 1 | ... | 1 |
| 3 | AREA C | (Xcs, Ycs) | (Xce, Yce) | 10 | 1 | 1 | 1 | 1 | ... | 1 |
| 6 | AREA F | (Xfs, Yfs) | (Xfe, Yfe) | 5 | 0 | 0 | 0 | 1 | ... | 1 |
| 7 | AREA G | (Xgs, Ygs) | (Xge, Yge) | 6 | 0 | 0 | 0 | 1 | ... | 1 |
| 8 | AREA H | (Xhs, Yhs) | (Xhe, Yhe) | 5 | 0 | 0 | 0 | 1 | ... | 1 |
| 9 | AREA I | (Xis, Yis) | (Xie, Yie) | 4 | 0 | 0 | 0 | 0 | ... | 0 |
| 10 | AREA J | (Xjs, Yjs) | (Xje, Yje) | 5 | 0 | 0 | 0 | 1 | ... | 1 |
| 11 | AREA K | (Xks, Yks) | (Xke, Yke) | 6 | 0 | 0 | 1 | 1 | ... | 1 |
| 12 | AREA L | (Xls, Yls) | (Xle, Yle) | 7 | 0 | 1 | 1 | 1 | ... | 1 |
| 13 | AREA M | (Xms, Yms) | (Xme, Yme) | 7 | 0 | 1 | 1 | 1 | ... | 1 |

| RECEIVABLE BROADCASTING STATION QUANTITY | CIRCLE PAD ALLOCATED PHYSICAL AREAS | | | |
|---|---|---|---|---|
| | C1 | C2 | C3 | C4 |
| 1 | P1 TO P12 | – | – | – |
| 2 | P1 TO P6 | P7 TO P12 | – | – |
| 3 | P1 TO P4 | P5 TO P8 | P9 TO P12 | – |
| 4 | P1 TO P3 | P4 TO 6 | P7 TO 9 | P10 TO P12 |

A21: SEGMENT CIRCLE PAD CIRCULAR AREA INTO FOUR LOGICAL AREAS R1 TO R4

A22: ALLOCATE FIRST RECEIVABLE BROADCASTING STATION TO LOGICAL AREA R1, SECOND RECEIVABLE BROADCASTING STATION TO LOGICAL AREA R2, THIRD RECEIVABLE BROADCASTING STATION TO LOGICAL AREA R3, AND SCROLL AREA S TO LOGICAL AREA R4, AND DISPLAY THEM.

(D)

A23: CURRENT POSITION ACQUISITION

A24: IDENTIFY AREA CORRESPONDING TO CURRENT POSITION (SET IN VARIABLE A)

A25: CA = A? (SAME AREA?)
- NO → A29: CA = A → (A)
- YES ↓

A26: CIRCLE PAD OPERATED (TOUCHED)?
- NO →
- YES ↓

A27: AREA ALLOCATED AS SCROLL AREA?
- YES → (C)
- NO ↓

A28: SWITCH DISPLAY TO BROADCASTING STATION ALLOCATED TO OPERATED POSITION

SELECTION CANDIDATE DISPLAY METHOD, SELECTION CANDIDATE DISPLAY DEVICE, AND INPUT/OUTPUT DEVICE

TECHNICAL FIELD

The present invention relates to a selection candidate display method, a selection candidate display device, and an input/output device which display a plurality of selectable selection candidates.

BACKGROUND ART

To date, with a television or radio, a channel has been selected by depressing operation buttons correlated one to each channel, or by operating an operation button displayed on a screen using a GUI (graphical user interface) with a pointing device or finger.

With a digital broadcast receiving device, which is a first heretofore known technology, a plurality of LEDs (light emitting diodes) are provided in the exterior upper portion of a screen, and receivable channels, and the reception status of each receivable channel, are displayed by the LEDs. Furthermore, a channel selection button being provided in the vicinity of each LED, it is possible to select a desired channel by operating the channel selection button (for example, refer to Japanese Unexamined Patent Publication JP-A 2003-274310).

A control signal input system, which is a second heretofore known technology, three concentric grooves, and twelve guide grooves extending radially from the center of the circles, being formed, is configured by an input device which inputs position information by pressing an optional position in the three grooves, and a display section formed of a GUI which displays selection items, for example, television channels, in positions corresponding to the grooves. The three concentric grooves are each segmented into twelve equal areas by the guide grooves. By causing each area to correspond to a selection item, it is possible for a user to operate intuitively (for example, refer to Japanese Unexamined Patent Publication JP-A 2006-229621).

However, with both of the heretofore known technologies, the quantity of operation buttons for selecting a selection candidate, for example, a channel, or the quantity of areas displaying selection candidates, is fixed. In the event that the quantity of channels, that is, of selection candidates, increases or decreases due to a change in external circumstances, for example, a new establishment or abolishing of a channel, or, in the event that it is a portable device, due to a change in external circumstances such as a fluctuation in receivable channels accompanying a movement, there is a problem in that the quantity of operation buttons, or the quantity of selection items, is insufficient or excessive.

DISCLOSURE OF INVENTION

An object of the invention is to provide a selection candidate display method, a selection candidate display device, and an input/output device which can efficiently display all selection candidates, even though the quantity of selection candidates increases or decreases.

The invention provides a selection candidate display method of displaying a plurality of selection candidates, comprising:

a determination step of determining whether or not a quantity of selection candidates is larger than a predetermined reference quantity;

a segmenting step of, in a case where it is determined at the determination step that the quantity of selection candidates is larger than the reference quantity, segmenting a circular area of a predetermined circle equally into the reference quantity;

a selection step of selecting a quantity of items of identification information which quantity is one subtracted from the reference quantity, from among items of identification information for identifying the selection candidates, in accordance with a predetermined selection condition;

an allocation step of allocating the items of identification information selected at the selection step, and change instructing information for instructing a change of selection candidate, to the areas segmented at the segmenting step;

a display step of displaying circular area information representing the circular area segmented at the segmenting step, and furthermore, displaying the items of identification information and change instructing information allocated to each area at the allocation step in the areas of the segmented circular area indicated by the displayed circular area information; and a reselection step of, when a predetermined operation for causing an item of identification information which is not being displayed to be displayed is carried out, newly selecting a quantity of items of identification information which includes items of identification information not being displayed, and which quantity is one subtracted from the reference quantity, in response to the predetermined operation, from among the items of identification information of the selection candidates, at the display step, every time items of identification information are newly selected at the reselection step, the area displaying the change instructing information moving to, and being displayed in, an adjacent area in a direction according to the predetermined operation, and the items of identification information newly selected at the reselection step being displayed in remaining areas among the areas segmented at the segmenting step, excepting the area in which the change instructing information is displayed.

Also, in the invention, it is preferable that the identification information includes numerical information differing for each selection candidate, the circular area is segmented into equal fan-shaped areas with the center of the circular area as their apex at the segmenting step, the predetermined selection condition is a condition such that the numerical information included in the identification information is in ascending order or descending order, and the predetermined order is an order such that the numerical information included in the identification information is in ascending order or descending order in a clockwise direction with respect to the center of the circular area.

Also, in the invention, it is preferable that, in a case where it is determined at the determination step that the quantity of selection candidates is equal to or smaller than the reference quantity, the predetermined circular area is segmented equally into the selection candidate quantity at the segmenting step, all the items of identification information of the selection candidates are allocated to the areas segmented at the segmenting step at the allocation step, and at the display step, the items of identification information allocated to each area at the allocation step are displayed in the segmented areas indicated by the displayed circular area information.

Also, the invention provides a selection candidate display device for displaying a plurality of selectable selection candidates, comprising:

a detection section which detects the quantity of selection candidates;

a determination section which determines whether or not a quantity of selection candidates detected by the detection section is larger than a predetermined reference quantity;

a segmenting section which segments a circular area of a predetermined circle equally into the reference quantity in a case where it is determined by the determination section that the quantity of selection candidates is larger than the reference quantity;

a display section which displays circular area information representing at least the circular area segmented into equal areas by the segmenting section;

a selection section which selects a quantity of items of identification information which quantity is one subtracted from the reference quantity, from among items of identification information for identifying the selection candidates, in accordance with a predetermined selection condition;

an allocation section which allocates the items of identification information selected by the selection section, and change instructing information for instructing a change of selection candidate, to the areas of the circular area indicated by the circular area information displayed on a display section;

a display control section which causes the items of identification information and change instructing information allocated to each area by the allocation section to be displayed on the display section in each area of the circular area indicated by the circular area information displayed on the display section;

an operation section which carries out a predetermined operation therethrough, among the areas displayed on the display section, in the area in which the change instructing information is displayed; and a reselection section which, when the predetermined operation is carried out through the operation section, newly selects a quantity of items of identification information which includes items of identification information not being displayed, and which quantity is one subtracted from the reference quantity, in response to the predetermined operation, from among the items of identification information of the selection candidates, every time items of identification information are newly selected by the reselection section, the display control section causing the area displaying the change instructing information to move to an adjacent area in a direction according to the predetermined operation and to be displayed on the display section, and causing the items of identification information newly selected by the reselection section to be displayed on the display section in remaining areas among the areas indicated by the circular area information displayed on the display section, excepting the area in which the change instructing information is displayed.

Also, the invention provides an input/output device comprising:

the selection candidate display device mentioned above; and an output device including an identification candidate operation section which operates therethrough, among the areas displayed on the display section included in the selection candidate display device, the areas in which the items of identification information are displayed, and a position information output section which outputs position information indicating the position of the area operated through the identification candidate operation section.

BRIEF DESCRIPTION OF DRAWINGS

Other and further objects, features, and advantages of the invention will be more explicit from the following detailed description taken with reference to the drawings wherein:

FIG. 3 is a block diagram showing a configuration of the portable terminal device;

FIG. 4 is a diagram showing an example of a receivable broadcasting station table;

FIG. 7 is a diagram showing an example of a physical area allocation table;

FIG. 13 is a flowchart showing the processing procedure of the channel display process executed by the controller.

BEST MODE FOR CARRYING OUT THE INVENTION

Figure 1:
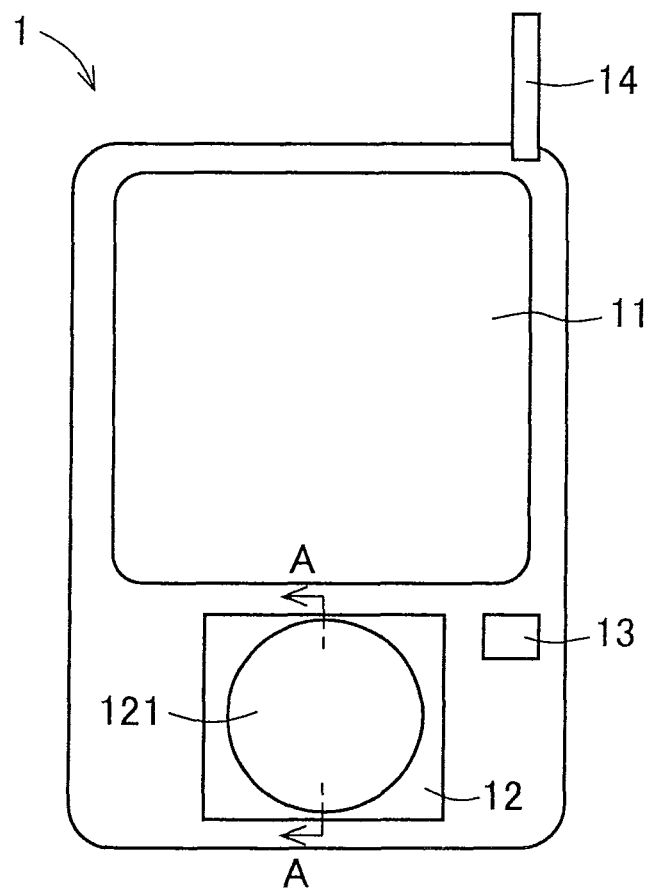
FIG. 1 is an external view of a portable terminal device, including an operation display module according to an embodiment of the invention.

Now referring to the drawings, preferred embodiments of the invention will be described in detail.

FIG. 1 is an external view of a portable terminal device 1, including an operation display module 12 according to an embodiment of the invention. The portable terminal device (hereafter called the "portable terminal") 1, being a portable type television (hereafter abbreviated to "TV"), is configured by a TV display module 11, the operation display module 12, a power button 13, and a TV antenna 14. A selection candidate display method according to the invention is implemented with the portable terminal device 1.

The TV display module 11, being configured of a display device such as, for example, a liquid crystal display, displays information such as image information. The operation display module 12 has a circle pad 121 which is a circular area, being formed therein, displays and inputs information for an operation. The power button 13 is an operation button for activating and deactivating a power source of the portable terminal device 1. The TV antenna 14 is an antenna which receives a signal such as a television broadcast.

Figure 2:
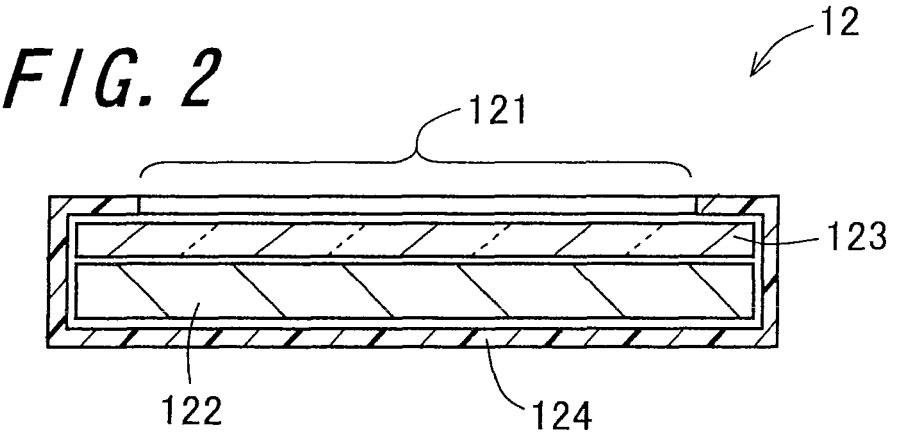
FIG. 2 is a sectional view of the operation display module.

FIG. 2 is a sectional view of the operation display module 12. The sectional view shown in FIG. 2 is a sectional view seen from the cross-sectional line A-A shown in FIG. 1. The operation display module 12 is configured by a sub-display module layer 122, a touch panel layer 123, and a device housing 124. The device housing 124 enveloping the sub-display module layer 122 and touch panel layer 123 in a laminated form, a circular opening portion exposing one portion of the touch panel layer 123 is formed therein. The circle pad 121 is a circular area portion of the sub-display module layer 122 and touch panel layer 123 formed by the opening portion.

The sub-display module layer 122, being configured of, for example, a liquid crystal display or the like, displays information such as image information. The touch panel layer 123, on being touched by, for example, a finger or the like, detects the position touched. The touch panel layer 123 transmits light, and information displayed on the sub-display module layer 122 can be seen through the touch panel layer 123.

FIG. 3 is a block diagram showing a configuration of the portable terminal device 1. The portable terminal device 1 includes the TV display module 11, the operation display module 12, a sound output module 16, a TV receiving module 17, a position acquisition module 18, a controller 19, a work memory 20, and a broadcasting station table module 21.

The TV display module 11 displays an image signal received from the TV receiving module 17 as an image. The operation display module 12 displays information specified by the controller 19 on the sub-display module layer 122, and sends position information representing a position detected by the touch panel layer 123 to the controller 19.

The sound output module 16, being configured of, for example, a speaker or the like, outputs a sound signal received from the TV receiving module 17 as a sound. The TV receiving module 17 receives a television broadcast of a channel specified by the controller 19, and demodulates it into a video signal and a sound signal. Then, the TV receiving module 17 sends the image signal to the TV display module 11, causing it to be displayed, and sends the sound signal to the sound output module 16, causing it to be outputted. The position acquisition module 18 is a device which detects a location, specifically a latitude and longitude, of the portable terminal device 1 using, for example, a GPS, and sends location information representing the detected latitude and longitude to the controller 19.

The controller 19 includes, for example, a storage device and a central processing unit (hereafter called the "CPU"). The storage device, being configured of, for example, a semiconductor memory or hard disc device, stores a program. The CPU executes the program stored in the storage device, and controls the operation display module 12, TV receiving module 17, and position acquisition module 18.

The work memory 20, being configured of, for example, a semiconductor memory, is a memory for storing information temporarily necessary for the controller 19 to carry out a processing. The broadcasting station table module 21, being configured of, for example, a non-volatile semiconductor memory, stores a table such as a receivable broadcasting station table 31, to be described hereafter, necessary for the controller 19 to carry out a processing.

The operation display module 12 and controller 19, serve as a selection candidate display device, as well as an input/output device. The position acquisition module 18 and controller 19 serve as a detection section; the controller 19 serves as a determination section, a segmenting section, a selection section, an allocation module, a display control module, and a reselection module; the sub-display module layer 122 serves as a display module; the touch panel layer 123 serves as an operation module and an identification candidate operation module; and the operation display module 12 serves as a position information output module and an output device.

FIG. 4 is a diagram showing an example of the receivable broadcasting station table 31. The receivable broadcasting station table 31, which is a table showing receivable broadcasting stations for each area, includes items "No.", "AREA NAME", "STARTING POSITION", "FINISHING POSITION", "RECEIVABLE BROADCASTING STATION QUANTITY", and "RECEIVABLE BROADCASTING STATIONS".

The "No." is a number given to each area, while the "AREA NAME" is identification information for identifying each area. The areas (hereafter also called the "areas") being individual areas demarcated in, for example, rectangles, they are defined by the latitude and longitude of the two apexes of one set of opposing corners of the opposing corners of the rectangle. The "STARTING POSITION" is the latitude and longitude of one apex of the two apexes, while the "FINISHING POSITION" is the latitude and longitude of the other apex. In the receivable broadcasting station table 31, the latitude and longitude are represented by (X,Y). X is the longitude, while Y is the latitude. The "RECEIVABLE BROADCASTING STATION QUANTITY" is the quantity of broadcasting stations which can be received in each area. The "RECEIVABLE BROADCASTING STATIONS" indicate for each broadcasting station name, specifically, for each of "BROADCASTING STATION 1" to "BROADCASTING STATION n", whether or not the broadcasting station is receivable in each area. Numeral "1" indicates that the broadcasting station is receivable, while numeral "0" indicates that it is not receivable.

In the receivable broadcasting station table 31 shown in FIG. 4, the "AREA NAME", "STARTING POSITION", "FINISHING POSITION", "RECEIVABLE BROADCASTING STATION QUANTITY", "BROADCASTING STATION 1", "BROADCASTING STATION 2", "BROADCASTING STATION 3", "BROADCASTING STATION 4", and "BROADCASTING STATION n", for each "No." are as follows. For No. "1", they are "AREA A", "(Xas,Yas)", "(Xae,Yae)", "10", "1", "1", "1", "1", and "1". For No "2", they are "AREA B", "(Xbs,Ybs)", "(Xbe,Ybe)", "11", "1", "1", "1", "1", and "1". For No. "3", they are "AREA C", "(Xcs,Ycs)", "(Xce,Yce)", "10", "1", "1", "1", "1", and "1". For No. "6", they are "AREA F", "(Xfs,Yfs)", "(Xfe,Yfe)", "5", "0", "0", "0", "1", and "1". For No "7", they are "AREA G", "(Xgs,Ygs)", "(Xge,Yge)", "6", "0", "0", "0", "1", and "1". For No. "8", they are "AREA H", "(Xhs,Yhs)", "(Xhe,Yhe)", "5", "0", "0", "0", "1", and "1". For No. "9", they are "AREA I", "(Xis,Yis)", "(Xie,Yie)", "4", "0", "0", "0", "0", and "0". For No "10", they are "AREA J", "(Xjs,Yjs)", "(Xje,Yje)", "5", "0", "0", "0", "1", and "1". For No. "11", they are "AREA K", "(Xks,Yks)", "(Xke,Yke)", "6", "0", "0", "1", "1", and "1". For No. "12", they are "AREA L", "(Xls,Yls)", "(Xle,Yle)", "7", "0", "1", "1", "1", and "1". For No "13", they are "AREA M", "(Xms,Yms)", "(Xme,Yme)", "7", "0", "1", "1", "1", and "1".

Figure 5:
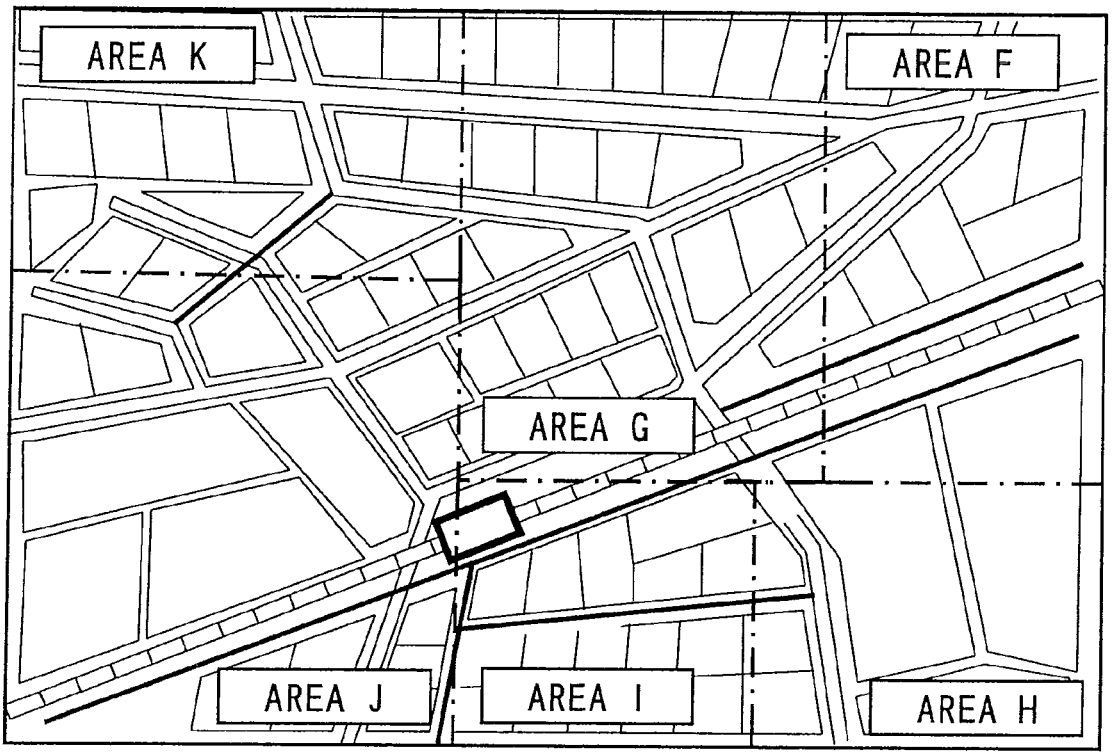
FIG. 5 is a diagram showing an example of a map demarcated into areas.

FIG. 5 is a diagram showing an example of a map 41 demarcated into areas. On the map 41, six areas, the areas of AREA F to AREA K, demarcated in rectangles are shown. The controller 19, referring to the receivable broadcasting station table 31, can identify the area name corresponding to the latitude and longitude shown in the location information received from the position acquisition module 18, and sense the quantity of broadcasting stations receivable in the area in which the portable terminal device 1 is currently located.

Figure 6:
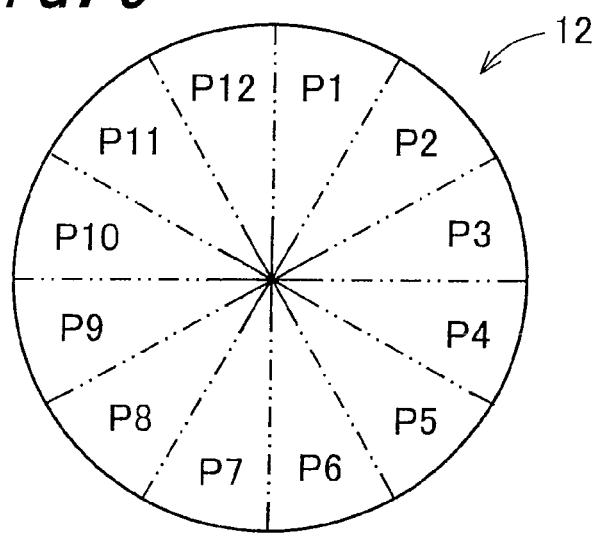
FIG. 6 is a diagram showing physical areas into which a circle pad is segmented.
Figure 8A:
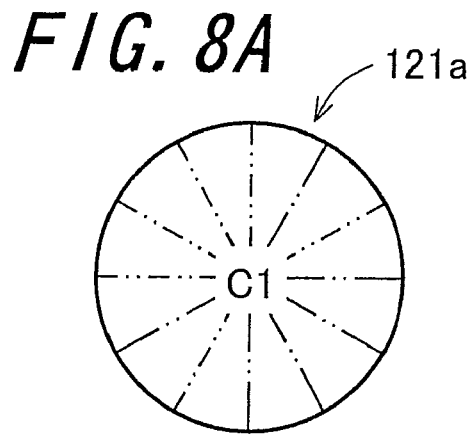
FIG. 8A is a diagram showing an example of the circle pad to which a broadcasting station is allocated.
Figure 8B:
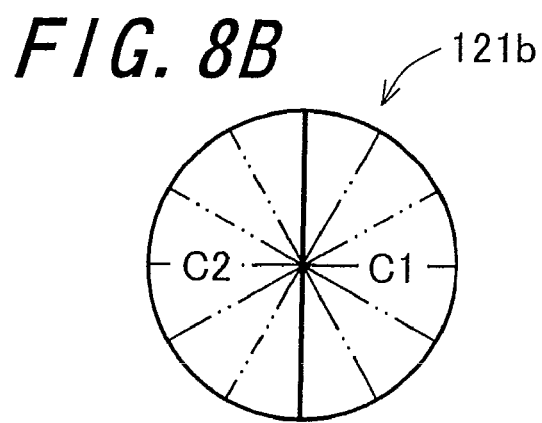
FIG. 8B is a diagram showing an example of the circle pad to which broadcasting stations are allocated.
Figure 8C:
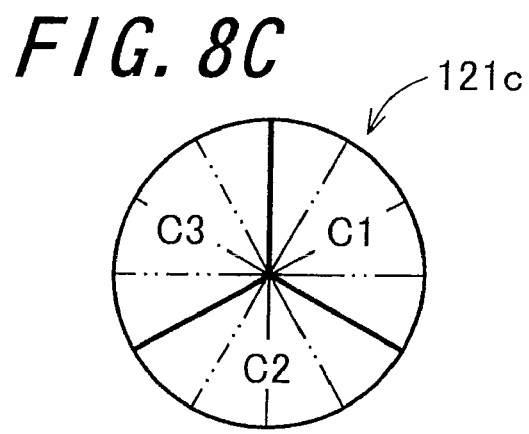
FIG. 8C is a diagram showing an example of the circle pad to which broadcasting stations are allocated.
Figure 8D:
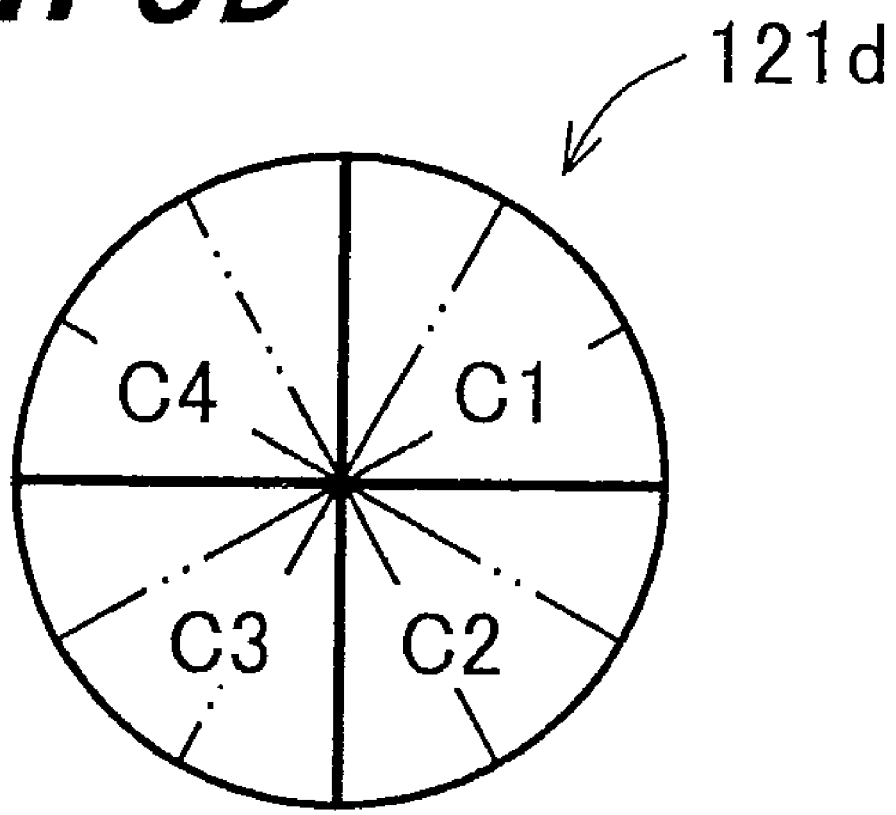
FIG. 8D is a diagram showing an example of the circle pad to which broadcasting stations are allocated.

FIG. 6 is a diagram showing physical areas into which the circle pad 121 is segmented. The circular area of the circle pad 121 is demarcated into twelve physical areas. One physical area being of a fan shape, the center of the circle of the circular area is the apex of the fan shape. The physical areas shown in FIG. 6 are shown as P1 to P12 in a clockwise direction with respect to the center of the circle. P1 to P12, which are items of identification information for the controller 19 to identify each physical area, are not displayed on the circle pad 121. The controller 19 can sense which physical area a finger has touched, from the position information received from the circle pad 121.

FIG. 7 is a diagram showing an example of a physical area allocation table 32. The physical area allocation table 32 shown in FIG. 7 is an example allocating the circular area of the circle pad 121 to a maximum of four broadcasting stations. Hereafter, the maximum quantity of broadcasting stations allocated to the circular area will be called a reference quantity. In the example shown in FIG. 7, the reference quantity is "4".

The physical area allocation table 32 includes items "RECEIVABLE BROADCAST STATION QUANTITY" and "CIRCLE PAD ALLOCATED PHYSICAL AREAS". The "RECEIVABLE BROADCAST STATION QUANTITY" is the quantity of broadcasting stations receivable in each area. The "CIRCLE PAD ALLOCATED PHYSICAL AREAS" show the allocated physical areas for each of channel numbers "C1" to "C4" by means of the identification information of the physical areas. The channel numbers, which are identification information, are information for identifying channels allocated to each broadcasting station. In the event that the channels, which are selection candidates, allocated to each broadcasting station differ depending on the area, they are correlated by preparing a table expressing a correlation between each broadcasting station and channel.

In the physical area allocation table 32 shown in FIG. 7, for the receivable broadcast station quantity "1", the physical areas P1 to P12 are allocated to the channel number "C1", for the receivable broadcast station quantity "2", the physical areas P1 to P6 are allocated to the channel number "C1", and the physical areas P7 to P12 to the channel number "C2", for the receivable broadcast station quantity "3", the physical areas P1 to P4 are allocated to the channel number "C1", the physical areas P5 to P8 to the channel number "C2", and the physical areas P9 to P12 to the channel number "C3", and for the receivable broadcast station quantity "4", the physical areas P1 to P3 are allocated to the channel number "C1", the physical areas P4 to P6 to the channel number "C2", the physical areas P7 to P9 to the channel number "C3", and the physical areas P10 to P12 to the channel number "C4".

The controller 19, based on the physical area allocation table 32, allocates the physical areas to the channels of the broadcasting stations receivable in the area in which the portable terminal device 1 is currently located.

FIGS. 8A to 8D are diagrams showing examples of the circle pad 121 to which the broadcasting stations are allocated. A circle pad 121a shown in FIG. 8A being the case in which the receivable broadcast station quantity is "1", the twelve physical areas, that is, the whole of the circular area, are allocated to the channel number "C1".

In the event that there are a plurality of receivable broadcasting stations, the channel numbers of each broadcasting station are displayed in ascending order or descending order in, for example, a clockwise direction. In the following examples, examples will be shown of displaying in ascending order in a clockwise direction. A circle pad 121b shown in FIG. 8B being the case in which the receivable broadcast station quantity is "2", six physical areas, that is, one half of the circular area, are allocated to each of the channel numbers "C1" and "C2". A circle pad 121c shown in FIG. 8C being the case in which the receivable broadcast station quantity is "3", four physical areas, that is, one third of the circular area, are allocated to each of the channel numbers "C1" to "C3". A circle pad 121d shown in FIG. 8D being the case in which the receivable broadcast station quantity is "4", three physical areas, that is, one quarter of the circular area, are allocated to each of the channel numbers "C1" to "C4".

Figure 9A:
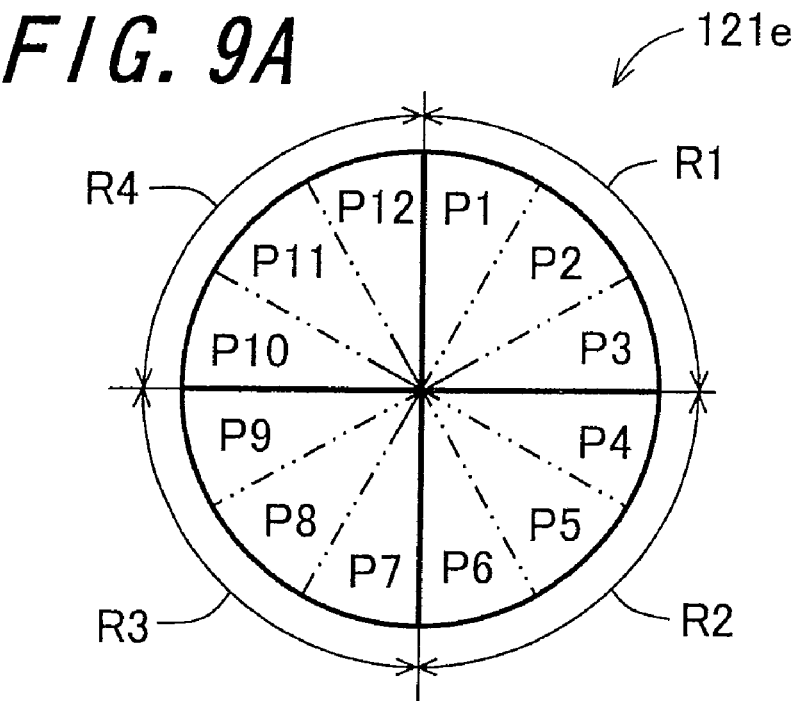
FIG. 9A is a diagram showing a relationship between logical areas and the physical areas of the circle pad.
Figure 9B:
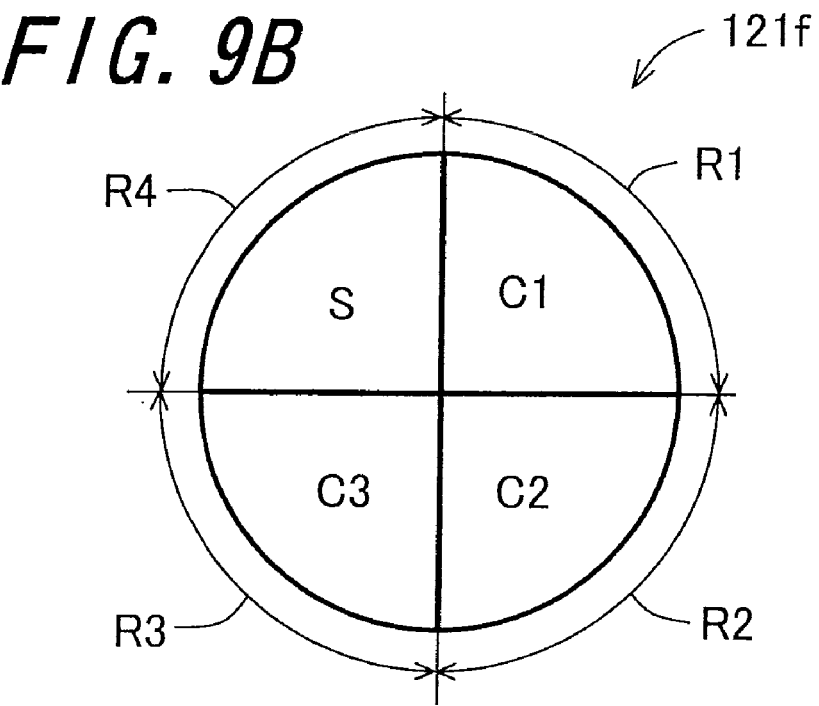
FIG. 9B is a diagram showing a relationship between logical areas and the physical areas of the circle pad.

FIGS. 9A and 9B are diagrams showing a relationship between logical areas and the physical areas of the circle pad 121. In the event that the quantity of broadcasting stations is five or more, physical areas are allocated to each broadcasting station using the logical areas. FIG. 9A is an example of a circle pad 121e wherein the twelve physical areas P1 to P12 are allocated to four logical areas R1 to R4. The physical areas P1 to P3 are allocated to the logical area R1, the physical areas P4 to P6 are allocated to the logical area R2, the physical areas P7 to P9 are allocated to the logical area R3, and the physical areas P10 to P12 are allocated to the logical area R4. A logical area allocation table showing a correlation of the logical areas and physical areas is shown in Table 1.

TABLE 1

| LOGICAL AREA | PHYSICAL AREAS |
| --- | --- |
| R1 | P1 to P3 |
| R2 | P4 to P6 |
| R3 | P7 to P9 |
| R4 | P10 to P12 |

FIG. 9B is an example of a circle pad 121f wherein three channels are allocated to three logical areas of the four logical areas, and a scroll area is allocated to the one remaining logical area. The broadcasting station with the channel number "C1" is allocated to the logical area R1, the broadcasting station with the channel number "C2" is allocated to the logical area R2, the broadcasting station with the channel number "C3" is allocated to the logical area R3, and a scroll area S is allocated to the logical area R4. The channel numbers "C1" to "C3" are displayed in the logical areas R1 to R3, and scroll information "S", signifying that it is the scroll area S, is displayed in the logical area R4. The scroll information "S" is change instructing information. A broadcast station allocation table showing a correlation of the logical areas and the broadcast stations and scroll area is shown in Table 2.

TABLE 2

| LOGICAL AREA | BROADCASTING STATION |
| --- | --- |
| R1 | C1 |
| R2 | C2 |
| R3 | C3 |
| R4 | S |

Figure 10:
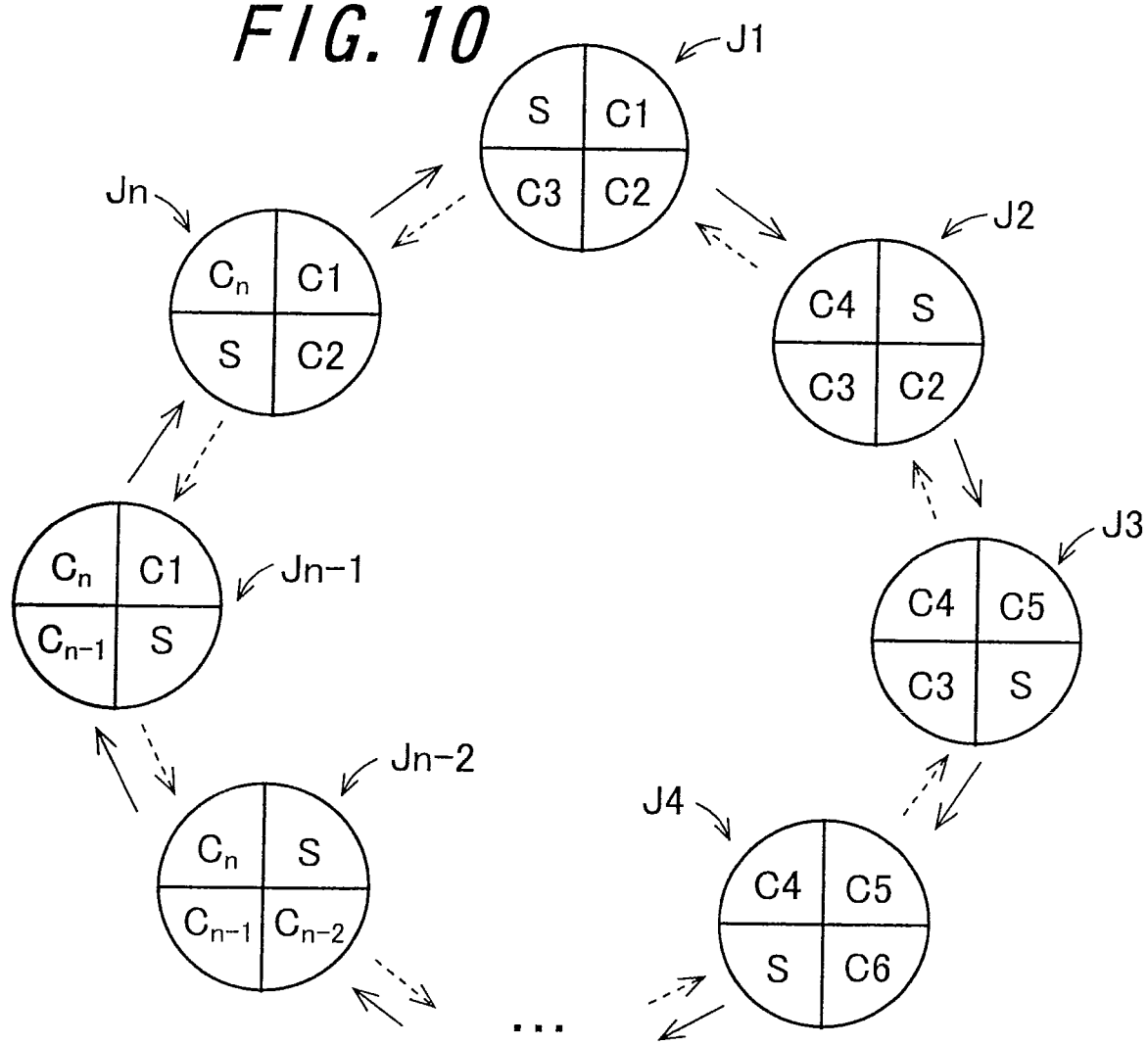
FIG. 10 is a diagram showing an example of a condition shift of the circle pad when the scroll area S is operated.

FIG. 10 is a diagram showing an example of a condition shift of the circle pad 121 when the scroll area S is operated. It is an example of a case in which the circular area of the circle pad 121 is allocated to a maximum of four broadcasting stations, and the quantity n of receivable broadcasting stations is five or more.

A solid arrow indicates a shift due to a right rotation drag operation, while a dotted arrow indicates a shift due to a left rotation drag operation. The right rotation drag operation is an operation wherein, for example, a finger is placed inside the area of the scroll area S, and the finger is moved, without breaking contact, in a clockwise direction to the adjacent logical area, while the left rotation drag operation is an operation wherein, for example, a finger is placed inside the area of the scroll area S, and the finger is moved, without breaking contact, in a counterclockwise direction to the adjacent logical area.

A condition J1, being an initial condition, is the same condition as the condition of the circle pad 121*f* shown in FIG. 9B. A condition J2 is a condition to which a shift is made due to the right rotation drag operation being carried out in the scroll area S in the condition J1. In the condition J2, the scroll area S moves to the logical area R1, and the broadcasting station with the channel number "C4" is newly allocated to the logical area R4. A condition J3 is a condition to which a shift is made due to the right rotation drag operation being carried out in the scroll area S in the condition J2. In the condition J3, the scroll area S moves to the logical area R2, and a broadcasting station with a channel number "C5" is newly allocated to the logical area R1. A condition J4 is a condition to which a shift is made due to the right rotation drag operation being carried out in the scroll area S in the condition J3. In the condition J4, the scroll area S moves to the logical area R3, and a broadcasting station with a channel number "C6" is newly allocated to the logical area R2.

A condition Jn is a condition to which a shift is made due to the left rotation drag operation being carried out in the scroll area S in the condition J1. In the condition Jn, the scroll area S moves to the logical area R3, and a broadcasting station with a channel number "$C_n$" is newly allocated to the logical area R4. A condition Jn−1 is a condition to which a shift is made due to the left rotation drag operation being carried out in the scroll area S in the condition Jn. In the condition Jn−1, the scroll area S moves to the logical area R2, and a broadcasting station with a channel number "$C_{n-1}$" is newly allocated to the logical area R3. A condition Jn−2 is a condition to which a shift is made due to the left rotation drag operation being carried out in the scroll area S in the condition Jn−1. In the condition Jn−2, the scroll area S moves to the logical area R1, and a broadcasting station with a channel number "$C_{n-2}$" is newly allocated to the logical area R2.

FIGS. 11A to 11D are diagrams showing other examples of the circle pad 121 to which broadcasting stations are allocated. They are examples in which the circular area of the circle pad 121 is allocated to a maximum of eight broadcasting stations. That is, they are examples in which the reference quantity is "8".

Figure 11A:
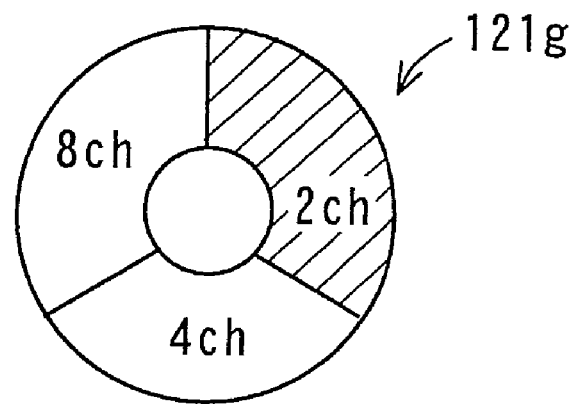
FIG. 11A is a diagram showing another example of the circle pad to which broadcasting stations are allocated.

FIG. 11A shows a circle pad 121*g* in a case in which the receivable broadcast station quantity is "3". The circular area of the circle pad 121*g* is segmented into three equal portions, and a channel number "2ch", a channel number "4ch", and a channel number "8ch" are displayed in each area. A selected area is displayed in a display form different from that of the other areas, for example, in a different color from that of the other areas. In FIG. 11A, it is shown that the shaded area is of a different color from that of the other areas.

Figure 11B:
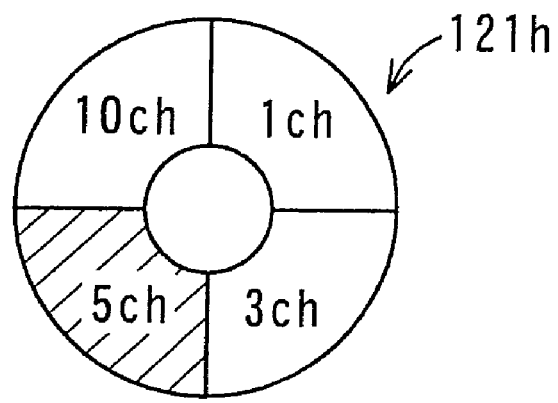
FIG. 11B is a diagram showing another example of the circle pad to which broadcasting stations are allocated.

FIG. 11B shows a circle pad 121*h* in a case in which the receivable broadcast station quantity is "4". The circular area of the circle pad 121*h* is segmented into four equal portions, and a channel number "1ch", a channel number "3ch", a channel number "5ch", and a channel number "10ch" are displayed in each area.

Figure 11C:
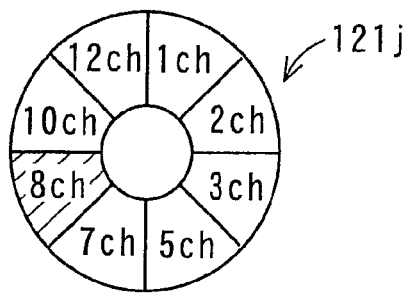
FIG. 11C is a diagram showing another example of the circle pad to which broadcasting stations are allocated.

FIG. 11C shows a circle pad 121*j* in a case in which the receivable broadcast station quantity is "8". The circular area of the circle pad 121*j* is segmented into eight equal portions, and the channel number "1ch", the channel number "2ch", the channel number "3ch", the channel number "5ch", a channel number "7ch", the channel number "8ch", the channel number "10ch", and a channel number "12ch" are displayed in each area.

Figure 11D:
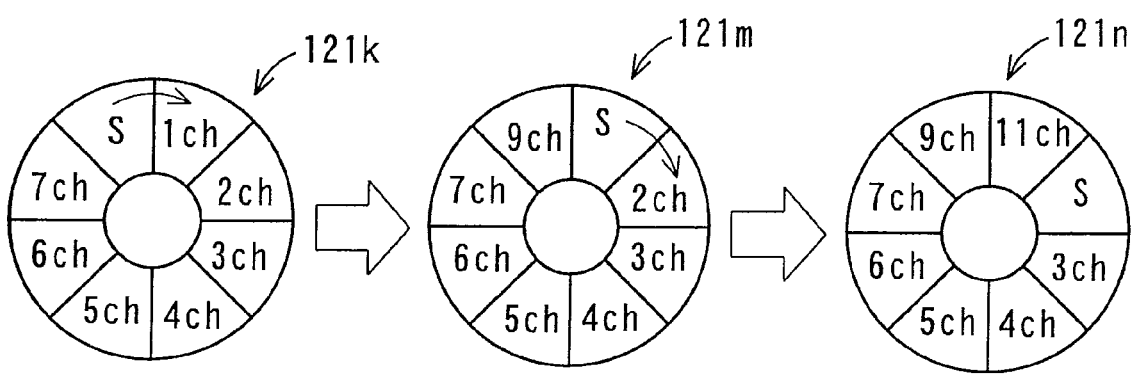
FIG. 11D is a diagram showing another example of the circle pad to which broadcasting stations are allocated.

FIG. 11D shows circle pads 121*k*, 121*m*, and 121*n* in a case in which the receivable broadcast station quantity is "9" or more. In the event that the receivable broadcast station quantity is "9" or more, broadcasting stations are allocated to seven logical areas of the eight logical areas, and the scroll area S is allocated to the one remaining logical area.

The circle pad 121*k* being an initial condition, broadcasting stations with the channel numbers "1ch" to "7ch" are allocated to the logical areas R1 to R7 respectively, and the scroll area S is allocated to the logical area R8. The circle pad 121*m* is a condition to which a shift is made by the right rotation drag operation being carried out in the condition of the circle pad 121*k*. The solid arrow indicates that it is the right rotation drag operation. The scroll area S moves from the logical area R8 to the logical area R1, and a broadcasting station with a channel number "9ch" is allocated to the logical area R8. The circle pad 121*n* is a condition to which a shift is made by the right rotation drag operation being carried out in the condition of the circle pad 121*m*. The scroll area S moves from the logical area R1 to the logical area R2, and a broadcasting station with a channel number "11ch" is allocated to the logical area R1.

Figure 12:
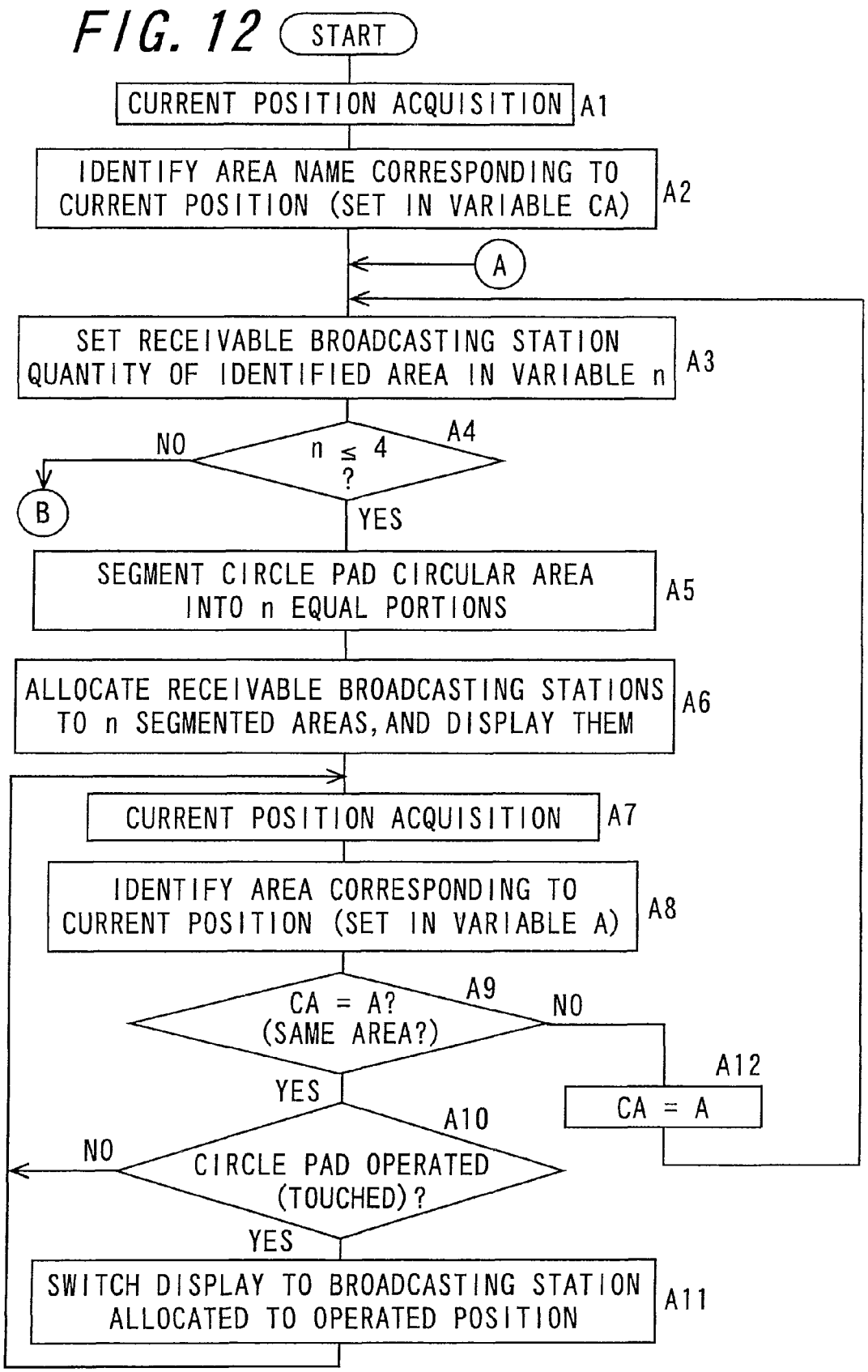
FIG. 12 is a flowchart showing a processing procedure of a channel display process executed by a controller.

FIG. 12 is a flowchart showing a processing procedure of a channel display process executed by the controller 19. On the power source of the portable terminal device 1 being activated, and an operable condition being attained, the procedure proceeds to step A1.

At step A1, the location information indicating the current location is acquired from the position acquisition module 18. At step A2, referring to the receivable broadcasting station table 31, the area name of the area corresponding to the current location indicated by the acquired location information is identified, and the identified area name is set in a variable CA. At step A3, the receivable broadcasting station quantity of the identified area is obtained from the receivable broadcasting station table 31, and is set in a variable n.

At step A4, it is determined whether or not the variable n is "4" or less. When the variable n is "4" or less, the procedure proceeds to step A5, while when the variable n is not "4" or less, the procedure proceeds to step A21 shown in FIG. 13. At step A5, the circular area of the circle pad 121 is segmented into n equal portions, and items of circular area information representing the segmented circular area, for example, area borders, are displayed in the circle pad 121. At step A6, the receivable broadcasting stations are allocated to the n segmented areas, and the channel numbers of the allocated receivable broadcasting stations are displayed in the respective areas of the circle pad 121.

At step A7, the location information indicating the current location is acquired from the position acquisition module 18. At step A8, referring to the receivable broadcasting station table 31, the area name of the area corresponding to the current location indicated by the acquired location information is identified, and the identified area name is set in a variable A. At step A9, it is determined whether or not the area name set in the variable CA matches the area name set in the variable A. When the area name set in the variable CA matches the area name set in the variable A, that is, when they are the same area, the procedure proceeds to step A10, while when the area name set in the variable CA does not match the area name set in the variable A, that is, when they are not the same area, the procedure proceeds to step A12.

At step A10, it is determined whether or not the circle pad 121 has been operated. When the circle pad 121 is touched, for example, when a finger is placed on the circle pad 121, it is determined that the circle pad 121 has been operated, and the procedure proceeds to step A11. When the circle pad 121 is not touched, for example, when no finger is placed on the circle pad 121, it is determined that the circle pad 121 has not been operated, and the procedure returns to step A7.

At step A11, an image displayed in the TV display module 11 is switched to the broadcasting station allocated to the logical area of the operated position, that is, the position in which the finger is placed, and the procedure returns to step A7. At step A12, the area name set in the variable A is set in the variable CA, and the procedure returns to step A3.

FIG. 13 is a flowchart showing the processing procedure of the channel display process executed by the controller 19. At step A4 shown in FIG. 12, when the variable n is not "4" or less, the procedure proceeds to step A21.

At step A21, the circular area of the circle pad 121 is segmented equally into the four logical areas R1 to R4, and the borders of the segmented logical areas are displayed in the circle pad 121.

At step A22, the receivable broadcasting stations are allocated to three logical areas of the four segmented logical areas, and the scroll area S is allocated to the one remaining logical area. Then, the channel numbers of the allocated receivable broadcasting stations, and information indicating that it is the scroll area S are displayed in the logical areas of the circle pad 121. Specifically, a first receivable broadcasting station is allocated to the logical area R1, a second receivable broadcasting station is allocated to the logical area R2, a third receivable broadcasting station is allocated to the logical area R3, and the scroll area S is allocated to the logical area R4, the channel numbers "1ch" to "3ch", for example, are displayed in the logical areas R1 to R3 respectively, and information, for example "S", indicating that it is the scroll area S is displayed in the logical area R4.

At step A23, the location information indicating the current location is acquired from the position acquisition module 18. At step A24, referring to the receivable broadcasting station table 31, the area name of the area corresponding to the current location indicated by the acquired location information is identified, and the identified area name is set in the variable A. At step A25, it is determined whether or not the area name set in the variable CA matches the area name set in the variable A. When the area name set in the variable CA matches the area name set in the variable A, that is, when they are the same area, the procedure proceeds to step A26, while when the area name set in the variable CA does not match the area name set in the variable A, that is, when they are not the same area, the procedure proceeds to step A29.

At step A26, it is determined whether or not the circle pad 121 has been operated. When the circle pad 121 is touched, for example, when a finger is placed on the circle pad 121, it is determined that the circle pad 121 has been operated, and the procedure proceeds to step A27. When the circle pad 121 is not touched, for example, when no finger is placed on the circle pad 121, it is determined that the circle pad 121 has not been operated, and the procedure returns to step A23.

At step A27, it is determined whether or not the operated logical area is the logical area to which the scroll area S is allocated. When the operated logical area is the logical area to which the scroll area S is allocated, the procedure proceeds to step A41 shown in FIG. 14, while when the operated logical area is not the logical area to which the scroll area S is allocated, the procedure proceeds to step A28. At step A28, an image displayed in the TV display module 11 is switched to the broadcasting station allocated to the logical area of the operated position, that is, the position in which the finger is placed, and the procedure returns to step A23. At step A29, the area name set in the variable A is set in the variable CA, and the procedure returns to step A3 shown in FIG. 12.

Figure 14:
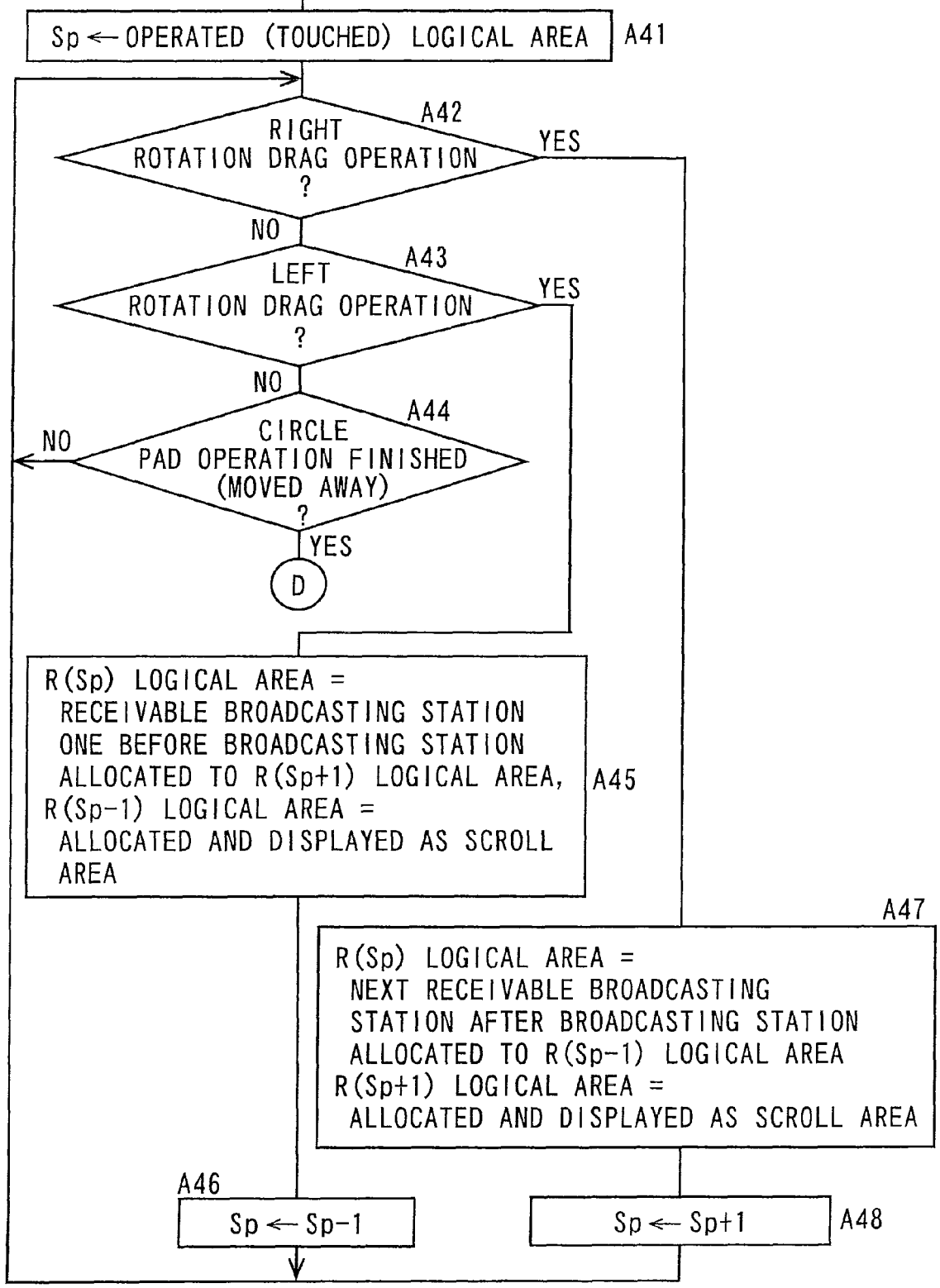
FIG. 14 is a flowchart showing the processing procedure of the channel display process executed by the controller.

FIG. 14 is a flowchart showing the processing procedure of the channel display process executed by the controller 19. At step A27 shown in FIG. 13, when the operated logical area is the logical area to which the scroll area S is allocated, the procedure proceeds to step A41.

At step S41, the logical area number of the operated, that is, touched logical area to which the scroll area S is allocated is set in a scroll pointer Sp. The logical area numbers are such that the logical area R1 is "1", the logical area R2 is "2", the logical area R3 is "3", and the logical area R4 is "4".

At step A42, it is determined whether or not there has been a right rotation drag operation. When there has been a right rotation drag operation, the procedure proceeds to step A47, while when there has not been a right rotation drag operation, the procedure proceeds to step A43. At step A43, it is determined whether or not there has been a left rotation drag operation. When there has been a left rotation drag operation, the procedure proceeds to step A45, while when there has not been a left rotation drag operation, the procedure proceeds to step A44.

At step A44, it is determined whether or not the circle pad operation is finished. When the finger leaves the circle pad 121, it is determined that the circle pad operation is finished, and the procedure returns to step A23 shown in FIG. 13, while when the finger does not leave the circle pad 121, it is determined that the circle pad operation is not finished, and the procedure returns to step A42.

At step A45, among the broadcasting stations receivable in the current area indicated by the receivable broadcasting station table 31, the receivable broadcasting station one before the broadcasting station allocated to the logical area with a number "1" larger than the number indicated by the scroll pointer Sp, is allocated to the logical area with the number indicated by the scroll pointer Sp. The receivable broadcasting station one before is the broadcasting station with the channel number one before in descending order when the channel numbers of the receivable broadcasting stations are arranged in ascending order. When the broadcasting station allocated to the logical area with the number "1" larger than the number indicated by the scroll pointer Sp is the broadcasting station with the smallest channel number, among the broadcasting stations receivable in the current area indicated by the receivable broadcasting station table 31, the broadcasting station with the largest channel number is allocated.

Furthermore, the scroll area S is allocated to the logical area with a number "1" smaller than the number indicated by the scroll pointer Sp. Then, the channel number of the newly allocated broadcasting station is displayed in the logical area with the number indicated by the scroll pointer Sp, and "S" is displayed in the logical area with the number "1" smaller than the number indicated by the scroll pointer Sp.

In FIG. 14, the logical area with the number indicated by the scroll pointer Sp is expressed as "R(Sp) logical area", the logical area with the number "1"smaller than the number indicated by the scroll pointer Sp as "R(Sp−1) logical area", and the logical area with the number "1" larger than the number indicated by the scroll pointer Sp as "R(Sp+1) logical area".

At step A46, "1" is subtracted from the value of the scroll pointer Sp, and the procedure returns to step A42. When the value of the scroll pointer Sp becomes "0" by subtracting "1" from the value of the scroll pointer Sp, "n" is set in the scroll pointer Sp.

At step A47, among the broadcasting stations receivable in the current area indicated by the receivable broadcasting station table 31, the next broadcasting station receivable after the broadcasting station allocated to the logical area with the number "1" smaller than the number indicated by the scroll pointer Sp, is allocated to the logical area with the number indicated by the scroll pointer Sp. The next receivable broadcasting station is the broadcasting station with the next channel number in ascending order when the channel numbers of the receivable broadcasting stations are arranged in ascending order. When the broadcasting station allocated to the logical area with the number "1" smaller than the number indicated by the scroll pointer Sp is the broadcasting station with the largest channel number, among the broadcasting stations receivable in the current area indicated by the receivable broadcasting station table 31, the broadcasting station with the smallest channel number is allocated.

Furthermore, the scroll area S is allocated to the logical area with the number "1" larger than the number indicated by the scroll pointer Sp. Then, the channel number of the newly allocated broadcasting station is displayed in the logical area with the number indicated by the scroll pointer Sp, and "S" is displayed in the logical area with the number "1" larger than the number indicated by the scroll pointer Sp.

At step A48, "1" is added to the value of the scroll pointer Sp, and the procedure returns to step A42. When the value of the scroll pointer Sp becomes "n+1" by adding "1" to the value of the scroll pointer Sp, "1" is set in the scroll pointer Sp.

Step A1 to step A4 serve as a determination step; step A21 serves as a segmenting step; step A22 serves as a selection step, an allocation step, and a display step; and, step A27 and step A41 to step A48 serve as a reselection step.

In this way, when displaying a plurality of selectable channels, the quantity of receivable channels is detected by the position acquisition module 18 and controller 19, it is determined by the controller 19 whether or not the quantity of channels detected by the position acquisition module 18 and controller 19 is larger than the predetermined reference quantity, the circular area of the predetermined circle is segmented equally into the reference quantity by the controller 19 in the event that it is determined by the controller 19 that the quantity of channels is larger than the reference quantity, circular area information, for example, area borders, representing at least the circular area segmented into equal areas by the controller 19 is displayed by the sub-display module layer 122, and a quantity of channel numbers which is one subtracted from the reference quantity is selected by the controller 19, from among the channel numbers for identifying the channels, in accordance with a predetermined selection condition.

Then, the channel numbers selected by the controller 19, and the scroll information for instructing a change of channel, are allocated by the controller 19 to the areas of the circular area indicated by the circular area information displayed on the sub-display module layer 122, the channel numbers and scroll information allocated to each area by the controller 19 are displayed by the controller 19 on the sub-display module layer 122 in each area of the circular area indicated by the circular area information displayed on the sub-display module layer 122, and a predetermined operation is carried out through the touch panel layer 123 in the area, among the areas displayed on the sub-display module layer 122, in which the scroll information is displayed.

Furthermore, when the predetermined operation is carried out through the touch panel layer 123, a quantity of channel numbers which includes channel numbers not being displayed, and which quantity is one subtracted from the reference quantity, is newly selected by the controller 19, in response to the predetermined operation, from among the channel numbers of the channels; every time channel numbers are newly selected by the controller 19, the area displaying the scroll information moves to an adjacent area in a direction according to the predetermined operation, and is displayed on the sub-display module layer 122; and the channel numbers newly selected by the controller 19 are displayed by the controller 19 on the sub-display module layer 122 in remaining areas among the areas indicated by the circular area information displayed on the sub-display module layer 122, excepting the area in which the scroll information is displayed.

Consequently, as it is possible to use one of the areas into which the circular area is segmented as an area for instructing a change of the channel numbers displayed, and cause a channel number not being displayed to be displayed with the same kind of operation as the operation selecting the channel numbers displayed in the other areas, it is possible to efficiently display all the channel numbers, even though the quantity of channels increases or decreases.

Furthermore, the operation display module 12 is included; the areas in which the channel numbers are displayed, among the areas displayed on the sub-display module layer 122 included in the operation display module 12, are operated through the touch panel layer 123 included in the operation display module 12; and position information indicating the position of the area operated through the touch panel layer 123 is outputted by the operation display module 12.

Consequently, it is possible to efficiently display all the channel numbers, even though the quantity of channels increases or decreases, and furthermore, to select a desired channel by selecting the area in which the channel number is displayed.

In this way, as it is possible to fix the size of the operation display module 12 by using the circle pad 121 in which the circular area is formed, it is possible to make it easy to carry out commodity design, application screen design, and the like. For example, as a replacement for a cursor key being used in an already commercialized product, a consideration of specifications at the commodity planning stage becomes easier, and it is also possible to easily carry out a consideration of whether or not it is possible to utilize an already existing molding die. Consequently, it is possible to shorten the development period, and also to reduce the development cost, and achieve a reduction in the commodity price.

Furthermore, when displaying the plurality of selectable channels, at step A1 to step A4, it is determined whether or not the quantity of channels is larger than the predetermined reference quantity. At step A21, in the event that it is determined at step A1 to step A4 that the quantity of channels is larger than the reference quantity, the circular area of the predetermined circle is segmented equally into the reference quantity. At step A22, a quantity of channel numbers which is one subtracted from the reference quantity is selected from among the channel numbers for identifying the channels in accordance with the predetermined selection condition. At step A22, the channel numbers selected at step A22, and the scroll information for instructing a change of channel, are allocated to the areas segmented at step A21.

At step A22, circular area information representing the circular area segmented at step A21 is displayed, and furthermore, the channel numbers and scroll information allocated to each area at step A22 are displayed in the areas of the segmented circular area indicated by the displayed circular area information. At step A27 and step A41 to step A48, when the predetermined operation for causing a channel number which is not being displayed to be displayed is carried out, a quantity of channel numbers which includes channel numbers not being displayed, and which quantity is one subtracted from the reference quantity, is newly selected in response to the predetermined operation, from among the channel numbers of the channels.

Furthermore, at step A22, the area displaying the scroll information moves to, and is displayed in, an adjacent area in a direction according to the predetermined operation every time channel numbers are newly selected at step A27 and step A41 to step A48, and the channel numbers newly selected at step A27 and step A41 to step A48, are displayed in remaining areas among the areas segmented at step A21, excepting the area in which the scroll information is displayed.

Consequently, as it is possible, by applying the selection candidate display method according to the invention, to use one of the areas into which the circular area is segmented as an area for instructing a change of the channel numbers displayed, and cause a channel number not being displayed to be displayed with an operation in that area, it is possible to efficiently display all the channel numbers, even though the quantity of channels increases or decreases.

Furthermore, the channel numbers including numerical information differing for each channel, as the circular area is segmented into equal fan-shaped areas with the center of the circular area as their apex at step A21, the predetermined selection condition is a condition such that the numerical information included in the channel numbers is in ascending order or descending order, and the predetermined order is an order such that the numerical information included in the channel numbers is in ascending order or descending order in a clockwise direction with respect to the center of the circular area, it is possible to display selection candidate identification information, for example, television or radio channels, in a circle in ascending order or descending order of channel number.

Furthermore, in the event that it is determined at step A1 to step A4 that the quantity of channels is equal to or smaller than the reference quantity, the predetermined circular area is segmented equally into the channel quantity at step A21, all the channel numbers of the channels are allocated to the areas segmented at step A21 at step A22, and at step A22, the channel numbers allocated to each area at step A22 are displayed in the segmented areas indicated by the displayed circular area information.

Consequently, as it is possible to display all the channel numbers in the event that there is a small quantity of channels, there is no need to carry out an operation of changing the channel numbers displayed, and it is possible to simplify the operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

Industrial Applicability

According to the invention, when displaying the plurality of selectable selection candidates, it is determined at the determination step whether or not the quantity of selection candidates is larger than the predetermined reference quantity. At the segmenting step, in the case where it is determined in the determination step that the quantity of selection candidates is larger than the reference quantity, the circular area of the predetermined circle is segmented equally into the reference quantity. At the selection step, a quantity of items of identification information which quantity is one subtracted from the reference quantity is selected from among the items of identification information for identifying the selection candidates, in accordance with the predetermined selection condition. At the allocation step, the items of identification information selected at the selection step, and the change instructing information for instructing a change of selection candidate, are allocated to the areas segmented at the segmenting step.

At the display step, the circular area information representing the circular area segmented at the segmenting step is displayed, and furthermore, the items of identification information and change instructing information allocated to each area at the allocation step are displayed in the areas of the segmented circular area indicated by the displayed circular area information. At the reselection step, when the predetermined operation for causing an item of identification information which is not being displayed to be displayed is carried out, a quantity of items of identification information which includes items of identification information not being displayed, and which quantity is one subtracted from the reference quantity, is newly selected in response to the predetermined operation, from among the items of identification information of the selection candidates.

Furthermore, at the display step, the area displaying the change instructing information moves to, and is displayed in, an adjacent area in a direction according to the predetermined operation every time items of identification information are newly selected at the reselection step, and the items of identification information newly selected at the reselection step are displayed in remaining areas among the areas segmented at the segmenting step, excepting the area in which the change instructing information is displayed.

Consequently, as it is possible, by applying the selection candidate display method according to the invention, to use one of the areas into which the circular area is segmented as an area for instructing a change of the selection candidates, and cause a selection candidate not being displayed to be displayed with an operation in that area, it is possible to efficiently display all the selection candidates, even though the quantity of selection candidates increases or decreases.

According to the invention, when displaying a plurality of selectable selection candidates, the quantity of selection candidates is detected by the detection section, it is determined by the determination section whether or not the quantity of selection candidates detected by the detection section is larger than the predetermined reference quantity, the circular area of the predetermined circle is segmented equally into the reference quantity by the segmenting section in the case where it is determined by the determination section that the quantity of selection candidates is larger than the reference quantity, circular area information representing at least the circular area segmented into equal areas by the segmenting section is displayed on the display section, and a quantity of items of identification information which quantity is one subtracted from the reference quantity is selected by the selection section, from among the items of identification information for identifying the selection candidates, in accordance with the predetermined selection condition.

Then, the items of identification information selected by the selection section, and the change instructing information for instructing a change of selection candidate, are allocated by the allocation section to the areas of the circular area indicated by the circular area information displayed on the display section, the items of identification information and change instructing information allocated to each area by the allocation section are displayed by the display control section on the display section in each area of the circular area indicated by the circular area information displayed on the display section, and a predetermined operation is carried out through the operation section in the area, among the areas displayed on the display section, in which the change instructing information is displayed.

Furthermore, when the predetermined operation is carried out through the operation section, a quantity of items of identification information which includes items of identification information not being displayed, and which quantity is one subtracted from the reference quantity, is newly selected by the reselection section, in response to the predetermined operation, from among the items of identification information of the selection candidates, the area displaying the change instructing information moves to an adjacent area in a direction according to the predetermined operation, and is displayed on the display section, every time items of identification information are newly selected by the reselection section, and the items of identification information newly selected by the reselection section are displayed on the display section in remaining areas among the areas indicated by the circular area information displayed on the display section, excepting the area in which the change instructing information is displayed.

Consequently, as it is possible to use one of the areas into which the circular area is segmented as an area for instructing a change of selection candidate, and cause a selection candidate not being displayed to be displayed with the same kind of operation as the operation selecting the selection candidates displayed in the other areas, it is possible to efficiently display all the selection candidates, even though the quantity of selection candidates increases or decreases.

According to the invention, the selection candidate display device and the output device are included, the areas in which the items of identification information are displayed, among the areas displayed on the display section included in the selection candidate display device, are operated through the identification candidate operation section included in the output device, and the position information indicating the position of the area operated through the identification candidate operation section is outputted by the position information output section included in the output device.

Consequently, it is possible to efficiently display all the selection candidates, even though the quantity of selection candidates increases or decreases, and furthermore, to select a desired selection candidate by selecting the area in which the item of identification information is displayed.

The invention claimed is:

1. A selection candidate display method of displaying a plurality of selection candidates, comprising:
    a determination step of determining whether or not a quantity of selection candidates is larger than a predetermined reference quantity;
    a segmenting step of, in a case where it is determined at the determination step that the quantity of selection candidates is larger than the reference quantity, segmenting a circular area of a predetermined circle equally into the reference quantity;
    a selection step of selecting a quantity of items of identification information which quantity is one subtracted from the reference quantity, from among items of identification information for identifying the selection candidates, in accordance with a predetermined selection condition;
    an allocation step of allocating the items of identification information selected at the selection step, and change instructing information for instructing a change of selection candidate, to the areas segmented at the segmenting step;
    a display step of displaying circular area information representing the circular area segmented at the segmenting step, and furthermore, displaying the items of identification information and change instructing information allocated to each area at the allocation step in the areas of the segmented circular area indicated by the displayed circular area information; and
    a reselection step of, when a predetermined operation for causing an item of identification information which is not being displayed to be displayed is carried out, newly selecting a quantity of items of identification information which includes items of identification information not being displayed, and which quantity is one subtracted from the reference quantity, in response to the predetermined operation, from among the items of identification information of the selection candidates,
    at the display step, every time items of identification information are newly selected at the reselection step, the area displaying the change instructing information moving to, and being displayed in, an adjacent area in a direction according to the predetermined operation, and the items of identification information newly selected at the reselection step being displayed in remaining areas among the areas segmented at the segmenting step, excepting the area in which the change instructing information is displayed.

2. The selection candidate display method of claim 1, wherein the identification information includes numerical information differing for each selection candidate,
    the circular area is segmented into equal fan-shaped areas with the center of the circular area as their apex at the segmenting step,
    the predetermined selection condition is a condition such that the numerical information included in the identification information is in ascending order or descending order, and
    the numerical information included in the identification information is in ascending order or descending order in a clockwise direction with respect to the center of the circular area.

3. The selection candidate display method of claim 1, wherein, in a case where it is determined at the determination step that the quantity of selection candidates is equal to or smaller than the reference quantity,
    the predetermined circular area is segmented equally into the selection candidate quantity at the segmenting step,
    all the items of identification information of the selection candidates are allocated to the areas segmented at the segmenting step at the allocation step, and
    at the display step, the items of identification information allocated to each area at the allocation step are displayed in the segmented areas indicated by the displayed circular area information.

4. A selection candidate display device for displaying a plurality of selectable selection candidates, comprising:
- a detection section which detects the quantity of selection candidates;
- a determination section which determines whether or not a quantity of selection candidates detected by the detection section is larger than a predetermined reference quantity;
- a segmenting section which segments a circular area of a predetermined circle equally into the reference quantity in a case where it is determined by the determination section that the quantity of selection candidates is larger than the reference quantity;
- a display section which displays circular area information representing at least the circular area segmented into equal areas by the segmenting section;
- a selection section which selects a quantity of items of identification information which quantity is one subtracted from the reference quantity, from among items of identification information for identifying the selection candidates, in accordance with a predetermined selection condition;
- an allocation section which allocates the items of identification information selected by the selection section, and change instructing information for instructing a change of selection candidate, to the areas of the circular area indicated by the circular area information displayed on a display section;
- a display control section which causes the items of identification information and change instructing information allocated to each area by the allocation section to be displayed on the display section in each area of the circular area indicated by the circular area information displayed on the display section;
- an operation section which carries out a predetermined operation therethrough, among the areas displayed on the display section, in the area in which the change instructing information is displayed; and
- a reselection section which, when the predetermined operation is carried out through the operation section, newly selects a quantity of items of identification information which includes items of identification information not being displayed, and which quantity is one subtracted from the reference quantity, in response to the predetermined operation, from among the items of identification information of the selection candidates,
- every time items of identification information are newly selected by the reselection section, the display control section causing the area displaying the change instructing information to move to an adjacent area in a direction according to the predetermined operation and to be displayed on the display section, and causing the items of identification information newly selected by the reselection section to be displayed on the display section in remaining areas among the areas indicated by the circular area information displayed on the display section, excepting the area in which the change instructing information is displayed.

5. An input/output device comprising:
the selection candidate display device of claim 4; and
an output device including an identification candidate operation section which operates therethrough, among the areas displayed on the display section included in the selection candidate display device, the areas in which the items of identification information are displayed, and a position information output section which outputs position information indicating the position of the area operated through the identification candidate operation section.

* * * * *